United States Patent [19]

Proebstle et al.

[11] Patent Number: 5,519,745
[45] Date of Patent: May 21, 1996

[54] LOWER TIE PLATE DEBRIS CATCHER FOR A NUCLEAR REACTOR

[75] Inventors: Richard A. Proebstle; Bruce Matzner, both of San Jose, Calif.

[73] Assignee: General Electric Company, Schenectady, N.Y.

[21] Appl. No.: 334,380

[22] Filed: Nov. 3, 1994

[51] Int. Cl.⁶ ................................... G21C 19/42
[52] U.S. Cl. .................. 376/313; 376/310; 376/438; 376/440; 376/352; 376/317
[58] Field of Search ................... 376/313, 317, 376/310, 440, 438, 352; 976/DIG. 264

[56] References Cited

U.S. PATENT DOCUMENTS

| | | | |
|---|---|---|---|
| 1,240,081 | 9/1917 | Moss . | |
| 1,504,233 | 8/1924 | Graham . | |
| 1,992,472 | 2/1935 | Craig | 210/165 |
| 3,414,474 | 12/1968 | Swanson | 176/68 |
| 3,528,885 | 9/1970 | Kumpf | 176/78 |
| 3,725,199 | 4/1973 | Notari et al. | 176/61 |
| 3,801,453 | 4/1974 | Jones | 176/78 |
| 3,840,051 | 10/1974 | Akashi et al. | 138/37 |
| 3,878,870 | 4/1975 | Atherton et al. | 138/42 |
| 3,879,259 | 4/1975 | Persson et al. | 176/36 R |
| 3,945,883 | 3/1976 | Hind et al. | 176/40 |
| 3,971,698 | 7/1976 | Wolff et al. | 176/78 |
| 4,032,398 | 6/1977 | Cross et al. | 176/43 |
| 4,036,690 | 7/1977 | Betts et al. | 176/40 |
| 4,053,358 | 10/1977 | Pennell | 176/50 |
| 4,053,359 | 10/1977 | Pennell et al. | 176/50 |
| 4,076,586 | 2/1978 | Bideau et al. | 176/78 |
| 4,096,032 | 6/1978 | Mayers et al. | 176/38 |
| 4,116,764 | 9/1978 | Jones | 176/38 |
| 4,165,256 | 8/1979 | Jabsen | 376/442 |
| 4,198,272 | 4/1980 | Salmon | 176/40 |
| 4,412,969 | 11/1983 | Tilbrook et al. | 376/280 |
| 4,420,457 | 12/1983 | Le Pargneux | 376/446 |
| 4,427,624 | 1/1984 | Marlatt et al. | 376/352 |
| 4,446,099 | 5/1984 | Schwind et al. | 376/277 |

(List continued on next page.)

FOREIGN PATENT DOCUMENTS

| | | |
|---|---|---|
| 90104066.5 | 12/1990 | China . |
| 0196611 | 3/1986 | European Pat. Off. . |
| 0289829 | 4/1988 | European Pat. Off. . |
| 0311037 | 12/1989 | European Pat. Off. . |
| 0455011A1 | 4/1991 | European Pat. Off. . |
| 0432739A1 | 12/1991 | European Pat. Off. . |
| 0435744A1 | 12/1991 | European Pat. Off. . |
| 0432738A1 | 12/1991 | European Pat. Off. . |
| 0466553A1 | 7/1992 | European Pat. Off. . |
| 4006264A1 | 2/1991 | Germany . |
| 54-19080 | 2/1979 | Japan . |
| 54-141989 | 5/1979 | Japan . |
| 54-102493 | 8/1979 | Japan . |
| 57-102215 | 6/1982 | Japan . |
| 60-162985 | 8/1985 | Japan . |
| 62-96891 | 5/1987 | Japan . |
| 63-157093 | 6/1988 | Japan . |
| 63-61183 | 8/1988 | Japan . |
| 64-39593 | 2/1989 | Japan . |
| 64-83189 | 3/1989 | Japan . |
| 3-111795 | 5/1991 | Japan . |
| 3-274491 | 12/1991 | Japan . |
| 1214998 | 12/1970 | United Kingdom . |

*Primary Examiner*—Donald P. Walsh
*Assistant Examiner*—Meena Chelliah
*Attorney, Agent, or Firm*—Nixon & Vanderhye

[57] ABSTRACT

The lower tie plate grid includes cylindrical bosses and webs interconnecting the bosses for supporting nuclear fuel rods and defining flow openings through the grid. Coolant flows through the flow openings for flow upwardly about the fuel rods. The grid includes upper and lower portions and a screen is disposed between the upper and lower grid portions upon assembly with the bosses and webs of the respective upper and lower grid portions in registry with one another. The grid portions are welded to one another whereby the apertured screen serves to separate debris from the coolant flowing through the flow openings. The screen has openings in registry with the openings defined by the bosses for receiving the end plugs of the fuel rods.

18 Claims, 4 Drawing Sheets

U.S. PATENT DOCUMENTS

| | | | |
|---|---|---|---|
| 4,505,877 | 3/1985 | Rion | 376/352 |
| 4,610,838 | 9/1986 | Gasparro et al. | 376/248 |
| 4,614,636 | 9/1986 | Walters | 376/451 |
| 4,615,862 | 10/1986 | Huckstein | 376/362 |
| 4,634,525 | 1/1987 | Yant | 210/171 |
| 4,652,425 | 3/1987 | Ferrari et al. | 376/352 |
| 4,655,995 | 4/1987 | Freeman et al. | 376/267 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,716,012 | 12/1987 | Gasparro et al. | 376/352 |
| 4,772,447 | 9/1988 | Manson et al. | 376/441 |
| 4,781,884 | 11/1988 | Anthony | 376/439 |
| 4,826,653 | 5/1989 | Nylund et al. | 376/444 |
| 4,828,791 | 5/1989 | DeMario | 376/352 |
| 4,832,905 | 5/1989 | Bryan et al. | 376/352 |
| 4,849,161 | 7/1989 | Brown et al. | 376/439 |
| 4,900,507 | 2/1990 | Shallenberger et al. | 376/352 |
| 4,919,883 | 4/1990 | Bryan et al. | 376/352 |
| 4,980,121 | 12/1990 | Roberts et al. | 376/439 |
| 5,009,839 | 4/1991 | King | 376/352 |
| 5,024,806 | 6/1991 | Cioffi et al. | 376/352 |
| 5,024,807 | 6/1991 | Hatfield et al. | 376/352 |
| 5,030,412 | 7/1991 | Yates et al. | 376/352 |
| 5,037,605 | 8/1991 | Riordan, III | 376/352 |
| 5,066,453 | 11/1991 | Heppenstall et al. | 376/352 |
| 5,071,617 | 12/1991 | Bryan et al. | 376/352 |
| 5,094,802 | 3/1992 | Riordan, III | 376/352 |
| 5,100,611 | 3/1992 | Nylund | 376/352 |
| 5,106,575 | 4/1992 | Nakamura et al. | 376/439 |
| 5,128,096 | 7/1992 | Grattier | 376/313 |
| 5,135,710 | 8/1992 | Grattier et al. | 376/313 |
| 5,160,697 | 11/1992 | Verdier et al. | 376/352 |
| 5,180,545 | 1/1993 | Grattier | 376/352 |
| 5,219,517 | 6/1993 | Nylund | 376/352 |
| 5,230,861 | 7/1993 | Nylund | 376/439 |
| 5,282,231 | 1/1994 | Adams et al. | 376/352 |
| 5,345,483 | 9/1994 | Johansson | 376/313 |
| 5,365,558 | 11/1994 | Lippert et al. | 376/445 |
| 5,384,814 | 1/1995 | Matzner et al. | 376/352 |

LOWER TIE PLATE DEBRIS CATCHER FOR A NUCLEAR REACTOR

TECHNICAL FIELD

The present invention relates to a lower tie plate grid for a nuclear reactor fuel bundle and particularly relates to a lower tie plate grid forming part of a lower tie plate assembly and having upper and lower portions secured to one another with a screen therebetween for separating debris from the flow of water coolant through the lower tie plate grid.

BACKGROUND

Boiling water nuclear reactors have been in operation for many years. Commencing with their initial construction and throughout their service lives, these reactors may accumulate debris in their closed circulation moderator systems. This debris can become an operating hazard if the debris is allowed to enter into the fuel bundle core region containing the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods, is heated to generate steam, and exits the upper portion of the core as a two-phase water steam mixture from which the steam is extracted for the generation of energy.

The core support castings and fuel bundles are a source of pressure loss in the circulation of water through the core. By properly controlling such pressure losses substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

The fuel bundles for a boiling water nuclear reactor include a fuel rod supporting lower tie plate assembly. Typically, this is a one-piece cast structure including an upper grid, a lower inlet nozzle and a structure providing a transition region from the inlet to the grid. The inlet nozzle provides for coolant entry to an enlarged flow volume within the flow transition region of the lower tie plate assembly. At the upper end of the flow volume, there is located a tie plate grid defining with the nozzle a flow volume. The tie plate grid has two purposes. First, it provides the mechanical support connection for the weight of the individual fuel rods to be transmitted through the entire lower tie plate assembly to the fuel support casting. Secondly, the tie plate grid provides a path for liquid water moderator to flow into the fuel bundle for passage between the side-by-side supported fuel rods.

Above the lower tie plate grid, each fuel bundle includes a matrix of upstanding fuel rods—sealed tubes each containing fissionable material which when undergoing nuclear reaction transfers energy to the flowing water to produce the power generating steam. The matrix of upstanding fuel rods includes at its upper end an upper tie plate assembly. This upper tie plate assembly holds at least some of the fuel rods in vertical side-by-side alignment. Some of the fuel rods are attached to both the upper and lower tie plate assemblies. Usually, water rods are also included between the upper and lower tie plate assemblies for improvement of the water moderator to fuel ratio, particularly in the upper region of the fuel bundle.

Fuel bundles also include a number of fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate lateral restraints for each fuel rod at their respective elevations and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by a channel. This channel causes water flowing between the upper and lower tie plate assemblies to be restricted to only one bundle in an isolated flow path between the tie plate assemblies. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, maintenance of the originally designed flow distribution is very important. Specifically, from the lower (high pressure) plenum inlet to the core to the outlet from the core of the steam and water mixture through the upper tie plate assemblies of the fuel bundles, about 20 pounds per square inch (psi) of the pressure drop is encountered at typical flow operating conditions. About 7 to 8 psi of this pressure drop occurs through the inlet orifice and fuel support casting. This pressure drop is mainly to assure the uniform distribution of coolant/moderator flow through the many fuel bundles making up the core of the reactor and is related to the prevention of operating instabilities within the reactor at certain power rates. At the lower tie plate assembly of each fuel bundle, from the inlet nozzle into the flow volume and through the tie plate grid, about 1 to 1½ psi pressure drop occurs which contributes to establishing flow distribution between the individual fuel rods of each fuel bundle. Finally, through the fuel bundle itself—from the exit of the lower tie plate assembly to the exit at the upper tie plate assembly—about 11 psi of pressure drop usually occurs. When new fuel bundles are introduced into a reactor core, these flow resistances must be preserved. Otherwise, the coolant/moderator flow distribution could be compromised among the various fuel types in the reactor core.

With respect to the tie plate grid of the lower tie plate assembly, a matrix of cylindrical bosses and webs generally form the grid. The bosses are sized to receive the fuel rod end plugs. The flow area between the bosses and webs is the primary factor in controlling pressure drop resulting from water flow through the grid.

In early grid constructions, since the fuel rods had greater cross-sectional diameters, the bosses were large. In more recent grid constructions, since the fuel rods have smaller cross-sectional diameters, the bosses are smaller. Also, in early constructions, fewer fuel rods formed a fuel bundle than in recent constructions.

Even with all of these changes in grid and bundle construction, however, it is necessary to avoid significantly altering pressure drop. For example, a core may be composed of older (8×8) bundles and newer (10×10) bundles, and the flow through each bundle preferably is uniform. One challenge with new fuel bundle constructions, and particularly, lower tie plate grid constructions, is to accommodate more fuel rods and perform debris catching functions yet maintain a flow rate equivalent to the flow resulting from older bundle constructions.

Typically, debris within boiling water nuclear reactors can include extraneous materials left over from reactor construction, debris liberated from corrosion during the reactor lifetime, and during the numerous outages and repairs, further debris accumulates. Because nuclear reactors constitute closed circulation systems, it will be appreciated that debris will essentially accumulate with increasing age and use of the reactor. A particularly vexing and usual place for the accumulation of debris is in the fuel bundles between the fuel rods, particularly in the vicinity of the fuel rod spacers. It will be recalled that each fuel rod is surrounded by a spacer at the particular elevation of the spacer. Debris particles tend to lodge between the spacer structure and the fuel rods and often dynamically vibrate with the coolant/moderator flow in abrading contact to the sealed cladding of the fuel rods.

SUMMARY OF THE INVENTION

The present invention provides a lower tie plate assembly for supporting the lower ends of fuel rods and includes a grid having a debris catcher. The grid includes discrete registering upper and lower portions defining a plurality of laterally spaced, generally cylindrical bosses, having through cylindrical openings, which extend between upper and lower surfaces of the lower tie plate grid and receive lower ends of the fuel rods. Webs also extend between those surfaces and interconnect the bosses. The bosses and webs define a plurality of flow openings through the grid. More particularly, the bosses are arranged on vertical centerlines arranged at the corners of square matrices, and the webs extend linearly between the bosses along the sides of the square matrices. Convex portions of the cylindrical bosses thus extend between the right angularly related webs of each matrix. Accordingly, the webs and the convex portions of the bosses define the flow openings through the grid.

In accordance with the present invention, the upper and lower portions of the grid are formed separately one from the other. For example, the upper portion may be cast as a separate part, while the lower portion, together with the remaining portion of the lower tie plate assembly, may be cast integrally as another part. The two cast parts are subsequently secured one to the other with the boss and web portions of the upper and lower grid portions registering one with the other. Between the upper and lower portions and in accordance with this invention, a debris catcher is disposed, the debris catcher in effect being sandwiched between the upper and lower portions of the lower tie plate grid.

In a preferred form of the present invention, the debris catcher comprises a screen, for example, a one-piece expanded metal foil having a series of small apertures and cylindrical openings therethrough. When the foil is located between the upper and lower grid portions and the latter secured to one another, these cylindrical openings register with the cylindrical openings through the bosses. Alternatively, the foil may be disposed between the upper and lower grid portions and, after securement of the latter to one another, the foil portions in the openings through the bosses may be removed. In this manner, the end plugs of the fuel rods may pass through the registering cylindrical openings in the bosses formed by the upper and lower grid portions and the foil. The apertures through the metal foil lie in the coolant flow path defined by flow openings through the grid between the bosses and webs of the registering upper and lower portions. The apertured metal foil in the flow openings prevents debris above a certain size from flowing with the coolant through the grid. Preferably, the upper and lower portions of the grid are of equal thickness. The bottom portion of the grid forms part of a standard lower tie plate casting while the upper portion is an entirely separate casting. After the metal foil is sandwiched between the upper and lower grid portions, the upper and lower grid portions are secured one to the other, for example, by welding about the outside of the tie plate grid.

In lieu of the foil and in accordance with another preferred embodiment hereof, a sinter square mesh material may be used. For example, a mesh having 10 wires per inch with a 0.030 inch wire outside diameter may be used. The mesh may be provided essentially in a woven pattern.

In a preferred embodiment according to the present invention, there is provided a lower tie plate grid comprising upper and lower grid portions for supporting fuel rods above the lower tie plate grid, each upper and lower grid portion including a plurality of laterally spaced boss portions defining openings sized for receiving lower ends of the fuel rods, and web portions interconnecting the boss portions to define with the boss portions a plurality of flow openings, the boss portions of the upper and lower grid portions lying in registration with one another and the web portions of the upper and lower grid portions lying in registration with one another thereby registering the upper and lower flow openings with one another for flowing coolant through the tie plate grid. A screen is disposed between the upper and lower grid portions and has openings therethrough in registry with the openings defined by the boss portions, the screen having apertured portions in the flow openings through the lower tie plate grid for separating debris from the coolant flowing through the flow openings.

In a further preferred embodiment according to the present invention, there is provided in a nuclear fuel assembly, a fuel rod support structure, comprising a lower tie plate assembly including an inlet nozzle, a lower tie plate grid and a transition structure defining a flow volume for receiving coolant entering the nozzle and flowing coolant to the lower tie plate grid, the lower tie plate grid having a lower grid portion and an upper grid portion and comprising a plurality of laterally spaced bosses defining openings sized for receiving lower ends of the fuel rods, the lower tie plate grid further including webs interconnecting the bosses to define with the bosses a plurality of flow openings through upper and lower surfaces of the lower tie plate grid for flowing coolant through the tie plate grid. A screen is disposed between the upper and lower grid portions intermediate the upper and lower surfaces and has openings therethrough in registry with the openings defined by the bosses, the screen having a plurality of apertures and being disposed in the flow openings between the bosses and the webs for separating debris from the coolant flowing through the flow openings. Means secure the upper and lower grid portions to one another with the screen therebetween.

In a still further preferred embodiment according to the present invention, there is provided a nuclear fuel bundle and support therefor comprising upper and lower tie plate assemblies, a nuclear fuel bundle between the upper and lower tie plate assemblies and including a plurality of fuel rods. The lower tie plate assembly includes means for supporting the nuclear fuel bundles, the lower tie plate assembly further including a lower tie plate grid having upper and lower grid portions, each upper and lower grid portions including a plurality of laterally spaced boss portions defining openings sized for receiving lower ends of the fuel rods, and web portions interconnecting the boss portions to define with the boss portions a plurality of flow openings, the boss portions of the upper and lower grid portions lying in registration with one another, and the web portions of the upper and lower grid portions lying in registration with one another thereby registering the upper and lower flow openings with one another for flowing coolant through the tie plate. A screen is disposed between the upper and lower grid portions and having openings therethrough in registry with the openings defined by the boss portions, the screen having apertured portions in the flow openings through the lower tie plate grid for separating debris from the coolant flowing through the flow openings. Means secure the upper and lower grid portions to one another with the screen therebetween.

Accordingly, it is a primary object of the present invention to provide a novel and improved lower tie plate grid for supporting a nuclear fuel bundle having discrete upper and lower portions with a foil or screen disposed therebetween for limiting the passage of debris in the moderator flow through the tie plate grid with minimal pressure drop.

BEST MODE FOR CARRYING OUT THE INVENTION

Figure 1:
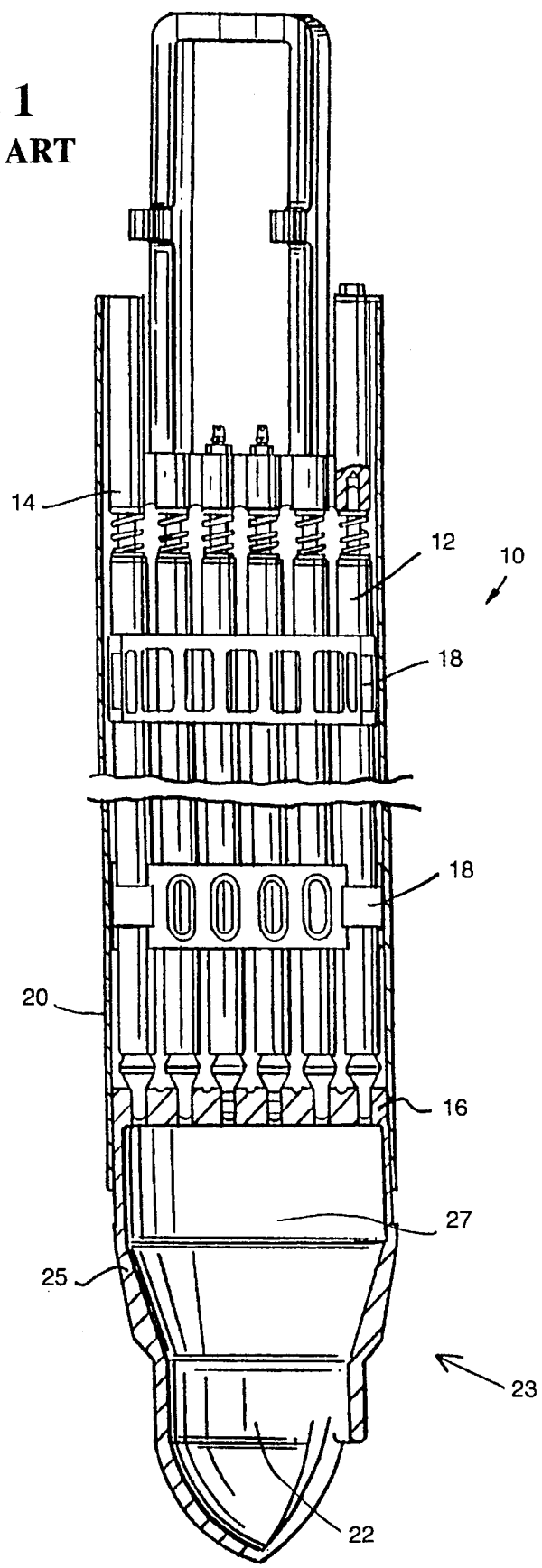
FIG. 1 is a vertical cross-sectional view of a conventional fuel assembly illustrating a fuel bundle supported on a lower tie plate assembly.

Referring now to the representative example of a fuel assembly, generally designated 10 in FIG. 1, there is illustrated a plurality of nuclear fuel rods 12 forming a nuclear fuel bundle. The rods 12 are connected at their upper ends to an upper tie plate 14 and are supported at their lower ends in a lower tie plate grid 16, forming part of a tie plate assembly, generally designated 23. Spacers 18 are arranged at a plurality of vertically spaced locations to maintain lateral spacing of the fuel rods 12 relative to one another. The fuel bundle is disposed within a fuel bundle channel 20 whereby coolant water inlet through the bottom nozzle or inlet opening 22 of the tie plate assembly 23 flows upwardly therefrom through a transition structure 25 defining an enlarged flow volume 27 for flow through the lower tie plate grid 16 thereof and about the fuel rods whereby steam is generated.

Figure 2:
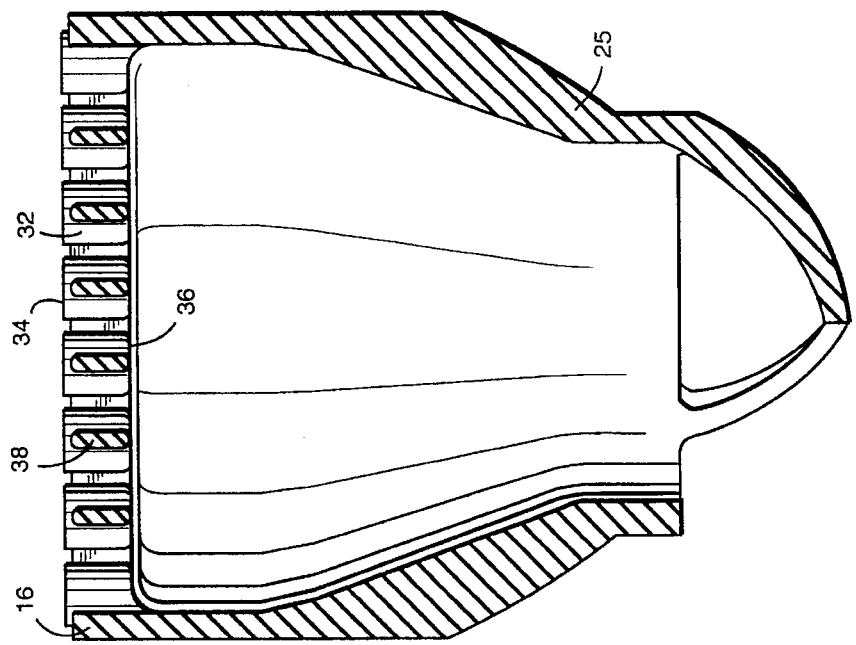
FIG. 2 is an enlarged top plan view of a conventional lower tie plate grid.
Figure 3:
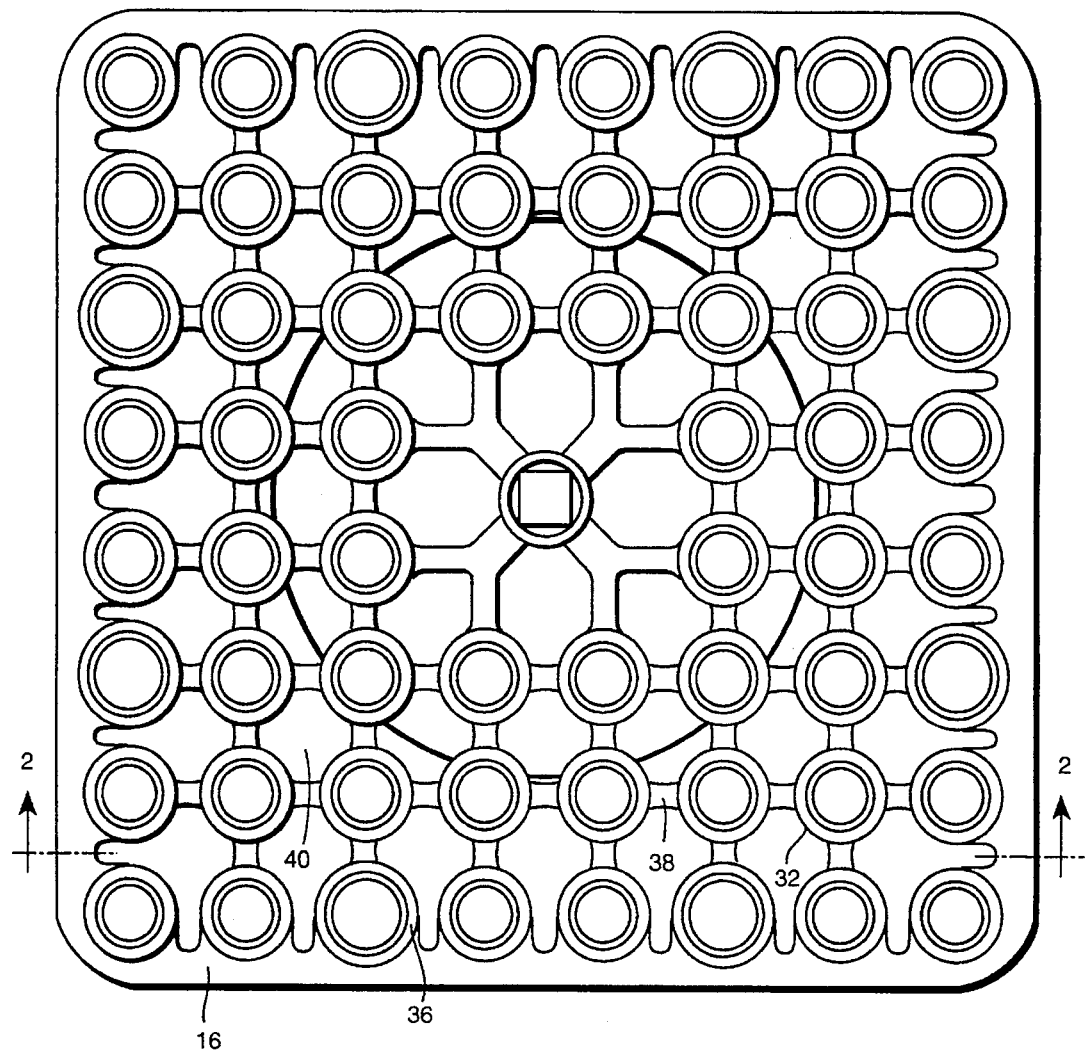
FIG. 3 is a cross-sectional view thereof.

In FIGS. 2 and 3, the lower tie plate assembly 23 is illustrated in greater detail. Particularly, the lower tie plate assembly grid 16 includes cylindrical bosses 32 which extend between the upper and lower surfaces 34 and 36 of the tie plate grid 16 for receiving the cylindrical end plugs of the nuclear fuel rods and supporting the latter. As illustrated in FIG. 2, the cylindrical bosses 32 have centerlines arranged at corners of substantially square matrices thereof. Interconnecting and forming the sides of the square matrices are webs 38 joining the adjacent cylindrical bosses 32 along radial lines of bosses 32. The webs and bosses extend between the upper and lower surfaces of the lower tie plate grid 16. Consequently, it will be seen that the webs 38 have portions formed along the sides of each square matrix and, together with convex outer portions of the cylindrical bosses 32, define coolant flow openings 40. Flow openings 40 extend between the upper and lower surfaces of the grid for flowing coolant from the flow volume 27 through the grid 16 and upwardly about the fuel rods supported by the lower tie plate assembly 23.

Figure 4:
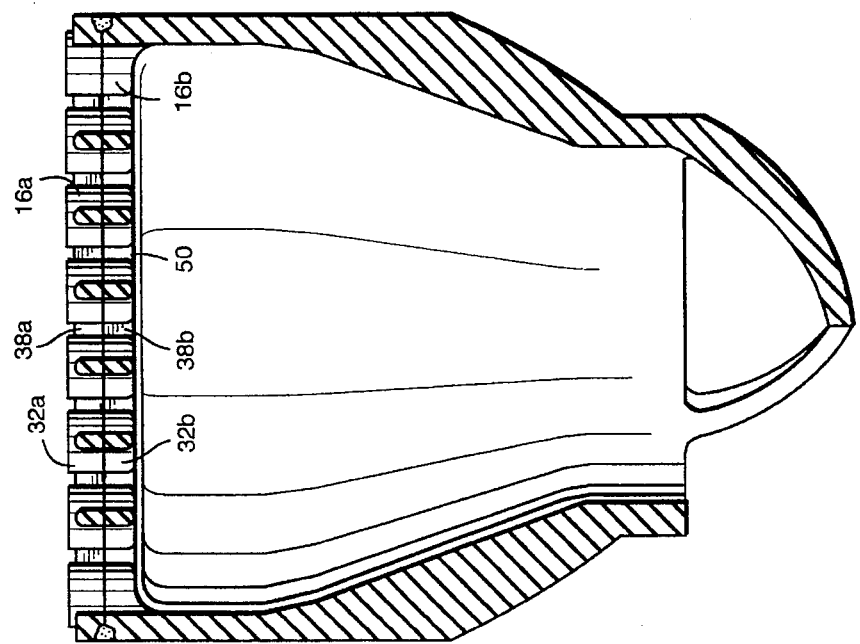
FIG. 4 is a view similar to FIG. 3 illustrating the debris catcher according to the present invention in place in the lower tie plate grid.
Figure 5:
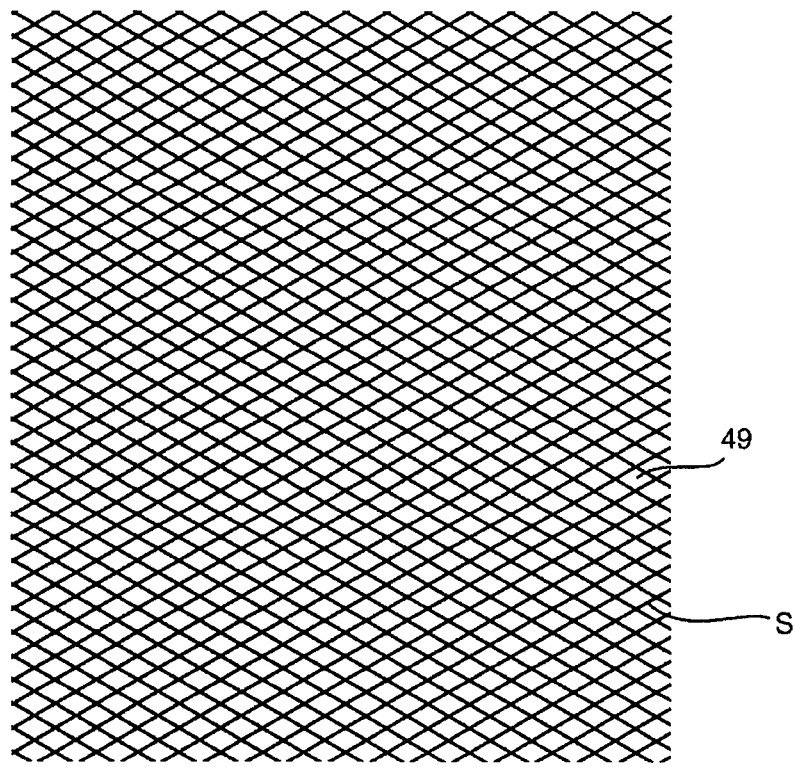
FIG. 5 is a plan view of an exemplary expanded metal mesh or foil for forming the debris catching screen according to the present invention.
Figure 6:
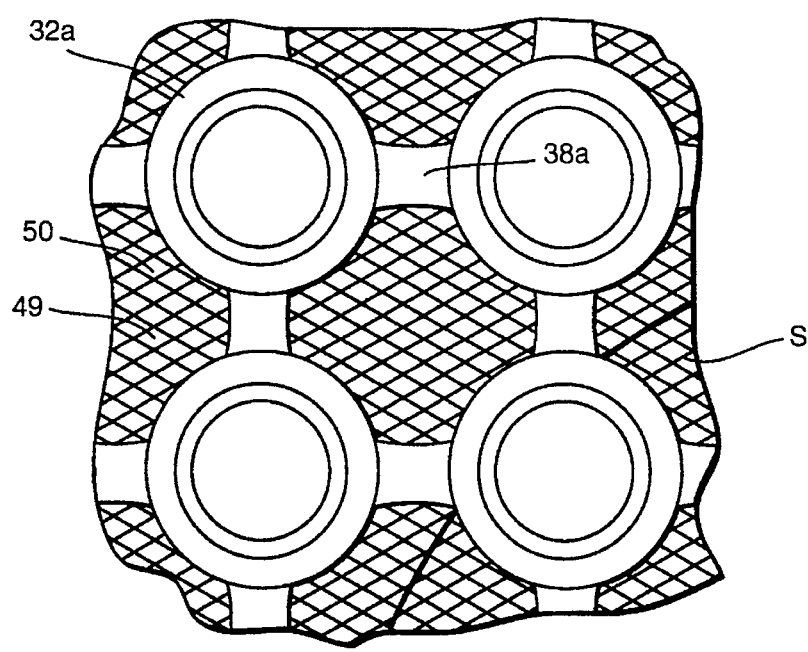
FIG. 6 is an enlarged fragmentary plan view of the lower tie plate grid illustrating the mesh or foil in place between the upper and lower grid portions and between bosses and webs in the flow openings.

Referring now to FIGS. 4–6, the debris catching function of the lower tie plate grid of the present invention is performed by a screen S disposed in a lower tie plate grid between discrete upper and lower portions thereof. To accomplish this, upper and lower grid portions 16a and 16b are formed. Upper grid portion 16a has boss and web portions 32a and 38a, respectively, while lower grid portion 16b has boss and web portions 32b and 38b, respectively. The boss and web portions of the upper and lower grid portions lie in respective registry with one another upon assembly thereof as described below. Preferably, the thicknesses of the upper and lower grid portions are equal to one another, although this could vary, with one or the other of the upper and lower portions having a greater thickness.

To perform the debris catching function, a screen is disposed between the upper and lower grid portions 16a and 16b. In a preferred embodiment of the present invention, the screen comprises an expanded metal foil or sheet. It will be appreciated that screens of this type may be formed by providing a series of discrete slits in a metal sheet which, when the metal sheet is expanded or stretched in its plane, forms a plurality of flow apertures 49 for the coolant. Alternatively, a square mesh sintered screen, for example, having 10 wires per inch with 0.030 inch O.D. may be used. Once the foil screen has been formed or the mesh sintered screen provided, another set of generally cylindrical openings are formed through the screen at locations for registration with the cylindrical openings through the aligned boss portions 32a, 32b, when the upper and lower grid portions 16a and 16b are assembled. Thus, the screen does not interfere with the cylindrical openings through the aligned bosses 32a, 32b whereby the latter may receive, after final assembly the end plugs of the nuclear fuel rods. It will be appreciated that the cylindrical openings through the screen may be formed after final assembly of the grid between the upper and lower grid portions.

When the screen is placed between the upper and lower grid portions 16a, 16b, the screen lies in the coolant flow openings 50 defined by the convex walls of the boss portions 32a, 32b and the web portions 38a, 38b interconnecting the boss portions. Once the screen is in place, for example, on the upper surface of the lower grid portion 16b, the upper grid portion 16a may be disposed over the screen with the bosses and webs thereof in registration with the bosses and webs, respectively, of the lower grid portion. Thus, the cylindrical openings of the bosses 16a, 16b register with one another and the flow openings 50a, 50b between the boss and web portions of the upper and lower grid portions 50a, 50b, respectively, lie in registry with one another and define through coolant flow openings 50. The upper and lower grid portions may then be secured to one another, preferably by welding about the periphery of the grid, although other types of securements, for example, bolts, may be employed.

It will be appreciated that in this configuration the coolant flows through the flow openings 50 and into and about the fuel rods supported by the lower tie plate assembly. The pressure drop using the metal screen in the flow openings 50 is minimal, yet debris above a certain size is caught and collected by the screen in the flow openings. It will be further appreciated that the flow openings 50 through the grid may be differently shaped. For example, venturi-like shapes can be designed into these flow openings to optimize the pressure drop reduction. Additionally, the lower edges of the webs and bosses can be radiussed to facilitate the flow at reduced pressures through the grid.

It will also be appreciated that the lower grid portion 16b may underlie the bosses through the upper grid portion and without openings in registration with the openings through the upper grid portion 16a. To accomplish this, the end plugs on the fuel rods may have a short threaded shank for threading into only the bosses of the upper grid portion 16a. With this arrangement, the screen S need not have holes through it in alignment with the upper grid portion inasmuch as the short shanks of the fuel rod end plugs do not extend through or past the screen.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A lower tie plate grid comprising:

upper and lower grid portions for supporting fuel rods above and forming in part said lower tie plate grid;

each said upper and lower grid portion including a plurality of laterally spaced boss portions defining openings sized for receiving lower ends of the fuel rods within the openings of said boss portions, and web portions interconnecting said boss portions to define with said boss portions a plurality of flow openings, the boss portions of said upper and lower grid portions lying in registration with one another and said web portions of the upper and lower grid portions lying in registration with one another thereby registering the openings through the respective upper and lower grid portions with one another and registering the upper and lower flow openings with one another for flowing coolant through said tie plate grid; and a screen disposed between said upper and lower grid portions of said tie plate grid and having openings therethrough in registry with the openings defined by said boss portions, said screen having apertured portions in the flow openings through said lower tie plate grid for separating debris from the coolant flowing through said flow openings.

2. A lower tie plate grid according to claim 1 wherein said upper and lower grid portions comprise discrete integral castings, and means for securing said upper and lower grid castings to one another with said screen therebetween.

3. A lower tie plate grid according to claim 1 wherein said boss portions are cylindrical and have vertical centerlines arranged at the corners of square matrices with said web portions extending linearly between said boss portions along sides of the square matrices and convex portions of said cylindrical boss portions extending between perpendicularly oriented web portions of each matrix, said web portions and said convex portions defining side walls of the flow openings.

4. A lower tie plate grid according to claim 1 wherein said screen comprises a metal foil.

5. A lower tie plate grid according to claim 1 wherein said screen comprises an expanded metal mesh.

6. A lower tie plate grid according to claim 1 wherein said securing means includes weldments along said upper and lower tie plate portions about an outer periphery of said tie plate.

7. A lower tie plate grid according to claim 1 wherein said upper and lower grid portions comprise discrete integral castings, and means for securing said upper and lower grid castings to one another with said screen therebetween, said screen comprising an expanded metal mesh.

8. A lower tie plate grid according to claim 7 wherein said boss portions are cylindrical and have vertical centerlines arranged at the corners of square matrices with said web portions extending linearly between said boss portions along sides of the square matrices and convex portions of said cylindrical boss portions extending between perpendicularly oriented web portions of each matrix, said web portions and said convex portions defining side walls of the flow openings, said securing means including weldments along said upper and lower tie plate portions about an outer periphery of said tie plate.

9. In a nuclear fuel assembly, a fuel rod support structure, comprising:

a lower tie plate assembly including an inlet nozzle, a lower tie plate grid and a transition structure defining a flow volume for receiving coolant entering said nozzle and flowing coolant to said lower tie plate grid;

said lower tie plate grid having a lower grid portion and an upper grid portion;

said lower tie plate grid comprising a plurality of laterally spaced bosses defining openings sized for receiving lower ends of the fuel rods within the openings of said bosses, said lower tie plate grid further including webs interconnecting said bosses to define with said bosses a plurality of flow openings through upper and lower surfaces of said lower tie plate grid for flowing coolant through said tie plate grid;

a screen disposed between said upper and lower grid portions intermediate said upper and lower surfaces and having openings therethrough in registry with the openings defined by said bosses, said screen having a plurality of apertures and being disposed in said flow openings between said bosses and said webs for separating debris from the coolant flowing through said flow openings; and means for securing said upper and lower grid portions to one another with said screen therebetween.

10. A fuel rod support structure according to claim 9 wherein each of the upper and lower grid portions includes portions of said bosses, said webs and said flow openings, the boss portions of said upper and lower grid portions lying in registration with one another and the web portions of said upper and lower grid portions lying in registration with one another thereby registering said upper and lower flow opening portions of said upper and lower grid portions.

11. A fuel rod support structure according to claim 10 wherein said bosses are cylindrical and have vertical centerlines arranged at the corners of square matrices with said webs extending linearly between said bosses along sides of the square matrices and convex portions of said cylindrical bosses extending between perpendicularly oriented webs of each matrix, said webs and said convex portions defining side walls of the flow spaces.

12. A fuel rod support structure according to claim 9 wherein said screen comprises a metal foil.

13. A fuel rod support structure according to claim 9 wherein said screen comprises an expanded metal mesh.

14. A fuel rod support structure according to claim 9 wherein said securing means includes welding said upper and lower tie plate portions about an outer periphery of said tie plate.

15. A nuclear fuel bundle and support therefor comprising:

upper and lower tie plate assemblies;

a nuclear fuel bundle between said upper and lower tie plate assemblies and including a plurality of fuel rods;

said lower tie plate assembly including means for supporting said nuclear fuel bundle, said lower tie plate assembly further including a lower tie plate grid having upper and lower grid portions;

each said upper and lower grid portions including a plurality of laterally spaced boss portions defining openings sized for receiving lower ends of said fuel rods within the openings of said boss portions, and web portions interconnecting said boss portions to define with said boss portions a plurality of flow openings, the boss portions of said upper and lower grid portions lying in registration with one another, and said web portions of said upper and lower grid portions lying in registration with one another thereby registering the openings through the respective upper and lower grid portions with one another and registering the upper and lower flow openings with one another for flowing coolant through said tie plate;

a screen disposed between said upper and lower grid portions and having openings therethrough in registry with the openings defined by said boss portions, said screen having apertured portions in the flow openings through said lower tie plate grid for separating debris from the coolant flowing through said flow openings; and means for securing said upper and lower grid portions to one another with said screen therebetween.

16. A nuclear fuel bundle and support therefor according to claim 15 wherein said screen comprises a metal foil.

17. A nuclear fuel bundle and support therefor according to claim 13 wherein said screen comprises an expanded metal mesh.

18. A nuclear fuel bundle and support therefor according to claim 14 wherein said securing means includes welding said upper and lower tie plate portions about an outer periphery of said tie plate.

\* \* \* \* \*